Oct. 7, 1958 R. T. ADAMS 2,855,462

MULTICHANNEL SIGNAL SYSTEM

Filed Dec. 22, 1955

INVENTOR
ROBERT T. ADAMS
BY Alfred C. Hill
AGENT

United States Patent Office 2,855,462

Patented Oct. 7, 1958

2,855,462

MULTICHANNEL SIGNAL SYSTEM

Robert T. Adams, Short Hills, N. J., assignor to International Telephone and Telegraph Corporation, Nutley, N. J., a corporation of Maryland Application December 22, 1955, Serial No. 554,877

9 Claims. (Cl. 179—15)

Figure 1:
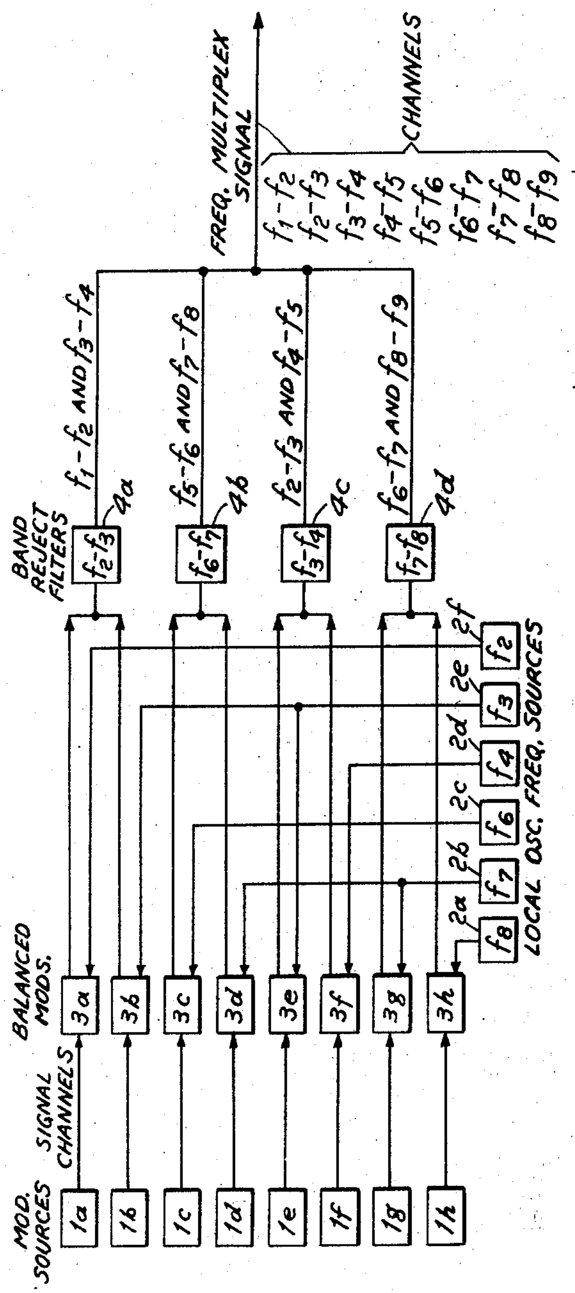

This invention relates to multichannel signal systems and more particularly to an improved multichannel single sideband signal system.

According to conventional theory, when energy waves of two frequencies are combined, the resultant signal contains components at new frequencies. These new frequencies include the sum and difference of the two original frequencies, the signal components at these frequencies being known as sidebands. Several distinct advantages have led to the use of either the sum or the difference frequency component in transmission systems. Increased ratio of power in the sideband to carrier power and narrower bandwidth are important advantages. Narrowerer bandwidth makes possible a higher signal-to-noise ratio and improved intermediate frequency amplifiers in the receiver.

Multichannel signal systems of the carrier type, such as employed in carrier telephony and signal systems, utilize either the upper or lower sidebands or a combination of both in a judicious manner to provide a plurality of different contiguous channels multiplexed on a frequency basis. In such systems, it is predeterminedly arranged that the carrier frequency will have a given upper and lower sideband frequency range. Any modulating signal falling in this predetermined frequency range will be transmitted by the selected sideband. If a number of carrier signals are properly chosen, each having the same frequency range for the sideband, and circuitry is arranged to select the upper sideband of certain carrier signals and the lower sideband of other carrier signals, it is possible to provide a plurality of adjacent single sideband channels covering different adjacent frequency bands which may be multiplexed on a frequency basis.

Heretofore, single sideband multichannel signal systems have employed a carrier frequency for two different audio signal sources. The audio signals of the two sources each modulate the carrier frequency in separate modulators within the sideband frequency range. There is thus provided at the output of the modulating means two double sideband signals having the same carrier frequency but different audio signals disposed relative to the carrier frequency in the same sideband frequency range. To the output of each modulating means is coupled a bandpass filter. The bandpass filter associated with the first audio source selects or passes only the upper sideband frequency range, and the bandpass filter associated with the second audio source selects or passes only the lower sideband frequency range. In a system employing more than two channels, a second local oscillator or carrier frequency is employed with the next two adjacent audio sources. The second carrier frequency is disposed relative to the first carrier frequency to position the upper sideband frequency range of the second carrier frequency immediately adjacent the lower sideband frequency range of the first carrier frequency in the transmisison frequency spectrum. The sideband selection is then accomplished in the same manner by employment of bandpass filters. The positioning of the carrier frequency and its sideband frequency range with respect to the previous carrier frequency and its sideband frequency range and the selection of the appropriate sideband frequency range will be carried forth as above to provide transmission of all audio sources present over the resultant single sideband channels as defined by the adjacent frequency ranges in the transmission frequency spectrum.

In the prior art arrangements as discussed above, the single sideband frequency channels are provided by employing a carrier frequency source for every two adjacent audio sources and a bandpass filter for each one of the audio sources. Thus, for an eight-channel single sideband carrier system, there are required four different carrier frequency sources and eight bandpass filters designed to pass the appropriate frequency range of the transmission frequency spectrum. It is common knowledge that filters, in general, are more expensive than oscillators to provide the carrier frequencies. Therefore, the filters of the carrier signal system are the most expensive components of the system.

Therefore, it is an object of this invention to provide an improved multichannel single sideband signal system which reduces by half the number of filters necessary to provide a single sideband signal system having the same number of channels as the prior art arrangement and thereby effect a sizable economical saving.

It should be pointed out at this time that the economic saving accomplished by employing the system of this invention is not the cost of the filters eliminated since to practice my invention it is necessary to employ more carrier signal sources than in the prior art. Thus, the saving realized in the reduction by one-half of the filters of the prior art is offset slightly by a one-quarter increase in carrier frequency sources. The saving realized, however, is more than one half of the cost of the filters eliminated since a filter costs more than a single one of the frequency sources.

The principal feature of this invention is the provision of at least one pair of double sideband signal sources disposed relative to each other such that the lower sideband frequency range of one of the sources of the pairs of sources coincides with the upper sideband frequency range of the other source of the pair of pulses and a band rejection filter coupled in parallel to the sources of the pairs of sources to provide at the output thereof a single sideband signal channel corresponding to the upper sideband frequency range of said one of the sources of the pair of sources and a single sideband signal channel corresponding to the lower sideband frequency range of said other sources of the pair of sources.

Figure 2:
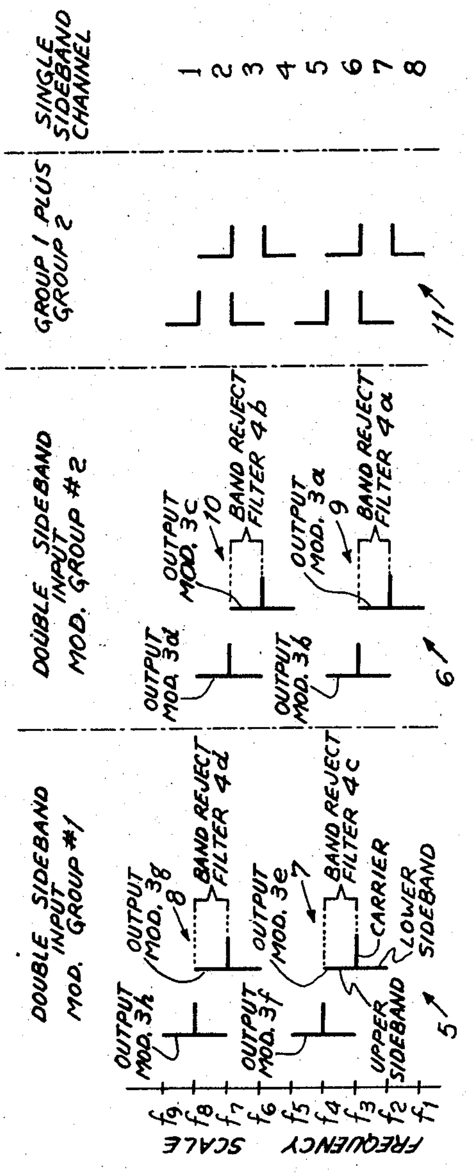

The above-mentioned and other features and objects of this invention will become more apparent by reference to the following description taken in conjunction with the accompanying drawings, in which:

Fig. 1 is a schematic diagram in block form of a multichannel single sideband signal system following the principles of this invention; and Fig. 2 is a diagrammatic representation of frequency relationships useful in explaining the operation of the system of Fig. 1.

Referring to Fig. 1, the multichannel single sideband signal system of this invention is illustrated as comprising a plurality of double sideband signal sources including modulation sources 1, carrier frequency or local oscillator frequency sources 2 and balanced modulators 3. Modulators 3 function to mix the signals of sources 1 and 2 to provide the desired double sideband signals. The output signals of modulators 3 are paired to provide an overlap between the lower sideband of one output signal of the paired modulators 3 and the upper sideband of another output signal of the paired modulators 3. The paired outputs of modulators 3 are coupled in parallel to band rejection filters 4 which reject the frequency range corresponding to the overlapping or coincident sidebands of the two signals coupled thereto. Filters 4 are capable of passing signals in the other sideband frequency range of the signals coupled to filters 4. The band rejection filters 4 provide a pair of equal frequency ranges spaced one from the other an equal amount, the equal rejection ranges of filters 4. By judiciously choosing the carrier frequency of sources 2 and the rejection band of filters 4, the transmission spectrum is divided into a plurality of contiguous single sideband signal channels multiplexed on a frequency basis.

The signals of sources 1 will occur within a given frequency range which will constitute the upper or lower sideband frequency range for any given carrier frequency. The frequencies F1 through F9 are separated by an equal increment, certain ones of which are selected as carrier frequencies to provide for the operation of Fig. 1 as illustrated in Fig. 2. In accordance with this invention, the outputs of balanced modulators 3 are grouped into two groups 5 and 6 as indicated in Fig. 2. Carrier frequencies to the modulators 3 of the first group are supplied from sources *2a*, *2b*, *2d*, and *2e*, and the carrier frequencies of the second group are supplied from sources *2b*, *2c*, *2e* and *2f*. Thus, in each of the groups we have, respectively, two pairs of double sideband signals 7, 8 and 9, 10 with the carrier frequencies of the pairs spaced by the modulation frequency range of the pairs of double sideband signals. It will further be noted that the carrier frequencies of group 6 are displaced from the carrier frequencies of group 5 by an amount equal to the modulation frequency range. In this arrangement, the second carrier frequencies of pairs 7 and 8 are equal to the first carrier frequencies of pairs 9 and 10. This is further illustrated by the utilization of sources *2b* and *2e* to supply their frequency signals to two different modulators 3 as shown schematically in Fig. 1. By employing this staggered arrangement of double sideband signals and appropriately selecting the rejection range of filters 4 to reject the overlapping sidebands of the double sideband signals as shown in Fig. 2, there is provided at the common output of Fig. 4 adjacent single sideband channels occupying equal portions of the transmission frequency spectrum as illustrated at 11 in Fig. 2.

While Figs. 1 and 2 of the drawing illustrate a multichannel system of eight channels, it is to be understood that the number of channels is not limited to eight and the multichannel system may be extended to accommodate any number of even numbered channels by extending the principles of this invention illustrated in Figs. 1 and 2.

While I have described above the principles of my invention in connection with specific apparatus, it is to be clearly understood that this description is made only by way of example and not as a limitation to the scope of my invention as set forth in the objects thereof and in the accompanying claims.

I claim:

1. A multichannel single sideband signal system comprising a first double sideband signal source having an upper sideband frequency range and a lower sideband frequency range, a second double sideband signal source having an upper sideband frequency range coincident with the lower sideband frequency range of said first source and a lower sideband frequency range, a band rejection filter having a frequency rejection range coincident with the upper sideband frequency range of said second source and means coupling said first and second sources in parallel to said rejection filter, said rejection filter providing at the output thereof a first single sideband signal channel corresponding to the upper sideband frequency range of said first source and a second single sideband signal channel corresponding to the lower sideband frequency range of said second source.

2. A system according to claim 1, wherein said double sideband signal sources each include a modulator, a modulation source coupled to said modulator and a local oscillator coupled to said modulator providing the carrier frequency for the signal of said modulation source, the frequencies of said local oscillators being displaced by a value equal to a sideband frequency range.

3. A system according to claim 1, wherein said double sideband signal sources each include a modulator, a modulation source, means coupling said modulation source to said modulator, a local oscillator to provide a carrier frequency for said single sideband signal channel and means coupling said local oscillator to said modulator, the frequencies of said local oscillators being separated by the frequency rejection range of said band rejection filter and coincident in value with the frequencies at the extremities of said frequency rejection range.

4. A multichannel single sideband signal system comprising a plurality of pairs of double sideband signal sources, each pair of sources having an upper sideband frequency range of one of its sources coincident with a lower sideband frequency range of the other of its sources, a plurality of band rejection filters each coupled to respective ones of said pair of sources having a frequency rejection range coincident with the corresponding coincident sideband frequency range of its associated pairs of sources, and means to combine the output of each of said band rejection filters to frequency multiplex the resultant single sideband signal channels.

5. A system according to claim 4, wherein the signal sources of each of said pairs of signal sources each include a modulator, a modulation source coupled to said modulator and an oscillator coupled to said modulator providing the carrier frequency for the signal of said modulation source, the frequencies of said oscillators in each of said pairs of signal sources being displaced by a value equal to a sideband frequency range.

6. A multichannel single sideband signal system comprising a plurality of pairs of double sideband signal sources, each pair of sources having an upper sideband frequency range of one of its sources coincident with a lower sideband frequency range of the other of its sources, a plurality of band rejection filters each coupled to respective ones of said pair of sources having a frequency rejection range coincident with the corresponding coincident sideband frequency range of its associated pairs of sources, the signal sources of each of said pairs of signal sources each include a balanced modulator, a modulation source coupled to said balanced modulator and an oscillator coupled to said balanced modulator providing the carrier frequency for the signal of said modulation source, the frequencies of said local oscillators in each of said pairs of signal sources being displaced by a value equal to a sideband frequency range with the carrier frequencies of certain ones of said plurality of oscillators being spaced from one another by a value equal to two times the sum of the upper and lower sideband frequency ranges and the carrier frequencies of others of said local oscillators having a value equal to the carrier frequency of given ones of the carrier frequency of said certain ones of said local oscillators to provide contiguous single sideband signal channels and means to combine the output of each of said band rejection filters to frequency multiplex the resultant single sideband signal channels.

7. A multichannel single sideband signal system comprising a plurality of pairs of double sideband signal sources, each pair of sources having an upper sideband frequency range of one of its sources coincident with a lower sideband frequency range of the other of its sources, a plurality of band rejection filters each coupled to respective ones of said pair of sources having a frequency rejection range coincident with the corresponding coincident sideband frequency range of its associated pairs of sources, the signal sources of each of said pairs of signal sources each include a modulator, a modulation source, means coupling said modulation source to said modulator, a local oscillator to provide a carrier frequency for said single sideband signal channel, and means coupling said local oscillator to said modulator, the frequencies of said local oscillators in each of said pairs of signal sources being separated by the frequency rejection range of said band rejection filter and coincident in value with the frequencies at the extremities of said band rejection frequency range and means to combine the output of each of said band rejection filters to frequency multiplex the resultant single sideband signal channels.

8. A multichannel single sideband signal system comprising a plurality of pairs of double sideband signal sources, each pair of sources having an upper sideband frequency range of one of its sources coincident with a lower sideband frequency range of the other of its sources, a plurality of band rejection filters each coupled to respective ones of said pair of sources having a frequency rejection range coincident with the corresponding coincident sideband frequency range of its associated pairs of sources, the signal sources of each of said pairs of signal sources each include a modulator, a modulation source, means coupling said modulation source to said modulator, a local oscillator to provide a carrier frequency for said single sideband signal channel, and means coupling said local oscillator to said modulator, the frequencies of said local oscillators in each of said pairs of signal sources being separated by the frequency rejection range of said band rejection filter and coincident in value with the frequencies at the extremities of said band rejection frequency range with the carrier frequencies of certain ones of said plurality of oscillators being spaced from one another by a value equal to four times the rejection range of said band rejection filters and the carrier frequencies of others of said local oscillators having a value equal to the carrier frequency of given ones of the carrier frequency of said certain ones of said local oscillators to provide contiguous single sideband signal channels, and means to combine the output of each of said band rejection filters to frequency multiplex the resultant single sideband signal channels.

9. A multichannel single sideband signal system comprising a plurality of pairs of double sideband signal sources, each pair of sources having an upper sideband frequency range of one of its sources coincident with a lower sideband frequency range of the other of its sources, a plurality of band rejection filters each coupled to respective ones of said pair of sources having a frequency rejection range coincident with the corresponding coincident sideband frequency range of its associated pairs of sources, the signal sources of each of said pairs of signal sources each include a modulator, a modulation source, means coupling said modulation source to said modulator, a local oscillator to provide a carrier frequency for said single sideband signal channel, and means coupling said local oscillator to said modulator, the frequencies of said local oscillators in each of said pairs of signal sources being separated by the frequency rejection range of said band rejection filter and coincident in value with the frequencies at the extremities of said band rejection frequency range with the signal sources of each of said pairs of signal sources being disposed in groups, the carrier frequencies of each of said pairs of signals within the groups being displaced with respect to each other by a frequency range equal to two times the sum of the upper and lower sideband frequency ranges and the carrier frequencies of said pairs of signal sources of one group being displaced relative to the adjacent group by a value equal to the frequency rejection range, and means to combine the output of each of said band rejection filters to frequency multiplex the resultant single sideband signal channels.

References Cited in the file of this patent

UNITED STATES PATENTS

| | | |
|---|---|---|
| 1,504,535 | Affel | Aug. 12, 1924 |
| 1,593,619 | Carpe | July 27, 1926 |
| 2,009,438 | Dudley | July 30, 1935 |